United States Patent
Nonoyama et al.

(10) Patent No.: US 7,251,931 B2
(45) Date of Patent: Aug. 7, 2007

(54) ACCUMULATING AMOUNT ESTIMATING DEVICE DETECTING DIFFERENTIAL PRESSURE OF FILTER

(75) Inventors: Yoshiharu Nonoyama, Okazaki (JP); Niro Takaki, Kariya (JP); Takeshi Hashizume, Mishima (JP); Tsukasa Kuboshima, Okazaki (JP)

(73) Assignees: Nippon Soken, Inc., Nishio, Aichi-pref. (JP); DENSO Corporation, Kariya, Aichi-pref. (JP)

( * ) Notice: Subject to any disclaimer, the term of this patent is extended or adjusted under 35 U.S.C. 154(b) by 7 days.

(21) Appl. No.: 11/200,261

(22) Filed: Aug. 10, 2005

(65) Prior Publication Data
US 2006/0042237 A1    Mar. 2, 2006

(30) Foreign Application Priority Data
Aug. 30, 2004   (JP) ............................. 2004-251014

(51) Int. Cl.
*F01N 3/00* (2006.01)
(52) U.S. Cl. ............................. 60/297; 60/274; 60/286; 60/295; 60/303; 60/311
(58) Field of Classification Search .................. 60/278, 60/280, 286, 295, 297, 301, 303, 311, 274
See application file for complete search history.

(56) References Cited

U.S. PATENT DOCUMENTS 6,807,807 B2 * 10/2004 Kagenishi ..................... 60/288
6,874,316 B2 * 4/2005 Nakatani ..................... 60/286
7,013,638 B2 * 3/2006 Hiranuma et al. ............. 60/286
7,051,519 B2 * 5/2006 Kuboshima et al. .......... 60/286
7,059,113 B2 * 6/2006 Hirota et al. ................. 60/277
7,069,721 B2 * 7/2006 Gotou .......................... 60/297

FOREIGN PATENT DOCUMENTS

| EP | 0 766 993 B1 | 3/2003 |
| JP | 9-94434 | 4/1997 |
| JP | 2003-166412 | 6/2003 |
| JP | 2003-166413 | 6/2003 |
| JP | 2003-184536 | 7/2003 |
| JP | 2003-293732 | 10/2003 |

* cited by examiner

*Primary Examiner*—Binh Q. Tran
(74) *Attorney, Agent, or Firm*—Nixon & Vanderhye P.C.

(57) ABSTRACT

A filter is arranged in an exhaust passage of an engine. The filter supports a catalyst. An accumulating amount estimating means detects differential pressure of the filter to estimate an amount of soot accumulating on the filter. An oxidizing condition detecting means detects an oxidizing condition of soot accumulating on the filter. A forcible oxidizing means increases temperature of the filter more than oxidizing temperature of soot for forcibly oxidizing soot accumulating in the vicinity of the catalyst of the filter. When the oxidizing condition detecting means detects a condition, in which soot accumulating on the filter is only partially oxidized, the accumulating amount estimating means estimates the amount of soot accumulating on the filter after oxidizing soot accumulating in the vicinity of the catalyst using the forcible oxidizing means.

14 Claims, 5 Drawing Sheets

ACCUMULATING AMOUNT ESTIMATING DEVICE DETECTING DIFFERENTIAL PRESSURE OF FILTER

CROSS REFERENCE TO RELATED APPLICATIONS

This application is based on and incorporates herein by reference Japanese Patent Application No. 2004-251014 filed on Aug. 30, 2004.

FIELD OF THE INVENTION

The present invention relates to a device that detects differential pressure of a filter to estimate an accumulating amount of an object on the filter.

BACKGROUND OF THE INVENTION

An internal combustion engine such as a diesel engine for a vehicle emits exhaust gas from an engine body. Exhaust gas includes particulate matters such as soot and soluble organic fraction (SOF). In general, a particulate filter is provided to an exhaust passage of an engine for collecting particulate matters, so that particulate matters are restricted from being discharged to the atmosphere.

When particulate matters such as soot are collected using a filter, the particulate matters accumulate on the filter, and the filter may be clogged. When the filter is clogged, pressure of exhaust gas may increase on the upstream of the filter. As a result, engine performance and fuel efficiency of the engine may be degraded. Therefore, in general, temperature of exhaust gas and a filter is increased to a specific temperature, which is equivalent to combustion temperature of soot, so that soot accumulating on the filter is burned and removed in a filter recovery operation. Thereby, the filter is capable of being restricted from causing clogging due to accumulation of soot.

However, when the filter recovery operation is performed in a condition, in which a large amount of soot accumulates on the filter, the accumulating soot quickly burns all together, and temperature of the filter may excessively increase. On the contrary, when the filter recovery operation is performed in a condition, in which a small amount of soot accumulates on the filter, the fuel efficiency of the engine may be degraded due to excessively repeating the filter recovery operation. Therefore, the amount of soot accumulating on the filter needs to be correctly detected for properly performing the filter recovery operation.

When a catalyst such as platinum is supported in the filter, soot accumulating in the vicinity of the catalyst on the filter is capable of being oxidized and burned by oxidation caused by the catalyst, even when temperature of the filter is less than the combustion temperature of soot.

A filter supporting a catalyst is disclosed in EP0766993B1 (JP-A-09-94434). In this filter structure, pieces of catalyst are supported on the surfaces of partition walls of the filter, and furthermore, pieces of catalyst are supported on the surfaces of pores (small holes) formed in the partition walls of the filter. Therefore, when soot accumulates around the catalyst supported on the surfaces of the partition walls and the pores, the soot is capable of being oxidized in the filter, even when temperature of the filter is less than the combustion temperature of soot. Thus, soot can be oxidized and burned at low temperature using the filter supporting the catalyst.

However, soot may not be oxidized and removed by the catalyst uniformly throughout the filter. For example, when temperature of exhaust gas increases, temperature difference may arise throughout the filter. In this case, soot accumulating on the filter may be partially oxidized by the catalyst.

In this situation, even when the amount of soot accumulating on the filter is the same, differential pressure between the upstream and the downstream of the filter may not be the same. Specifically, the differential pressure of the filter may vary depending on both the amount of soot, which is oxidized by the catalyst, and a region, in which oxidized soot accumulates on the filter. Accordingly, it is difficult to estimate the amount of soot, which accumulates on the filter, in accordance with the differential pressure of the filter.

An accumulating amount estimating device is disclosed in JP-A-2003-166413. In this accumulating amount estimating device, when the differential pressure of the filter does not reflect the amount (soot accumulating amount) of soot accumulating on the filter, the device estimates the soot accumulating amount in accordance with a past trend of the differential pressure of the filter in a predetermined period. Specifically, when a variation in differential pressure of the filter is less than a predetermined degree in the predetermined period, the device estimates the soot accumulating amount on the basis of the past variation in the differential pressure of the filter. Thereby, the accumulating amount of soot is capable of being estimated, even when the accumulating amount of soot is hard to be estimated in accordance with the difference pressure of the filter.

However, in the accumulating amount estimating device disclosed in JP-A-2003-166413, the accumulating amount of soot is estimated on the basis of the past trend of the differential pressure of the filter in a condition, in which the differential pressure of the filter does not represent the accumulating amount of soot. Accordingly, the estimation of the accumulating amount is not accurate in this device.

SUMMARY OF THE INVENTION

In view of the foregoing and other problems, it is an object of the present invention to provide an accumulating amount estimating device that is capable of properly estimating an accumulating amount of soot on a filter.

According to one aspect of the present invention, an accumulating amount estimating device includes a filter, an accumulating amount estimating means, an oxidizing condition detecting means, and a forcible oxidizing means.

The filter, which supports a catalyst, is arranged in an exhaust passage of an internal combustion engine. The accumulating amount estimating means detects differential pressure of the filter. The accumulating amount estimating means estimates an amount of soot accumulating on the filter in accordance with the differential pressure of the filter. The differential pressure of the filter is differential pressure between upstream of the filter and downstream of the filter. The oxidizing condition detecting means detects an oxidizing condition of soot accumulating on the filter. The forcible oxidizing means increases temperature of the filter to be equal to or greater than oxidizing temperature of soot for forcibly oxidizing soot accumulating in the vicinity of the catalyst supported by the filter.

When the oxidizing condition detecting means detects a condition, in which soot accumulating in the vicinity of the catalyst on the filter is only partially oxidized, the accumulating amount estimating means estimates the amount of soot accumulating on the filter after the forcible oxidizing means oxidizes soot accumulating in the vicinity of the catalyst on the filter.

Here, the oxidizing temperature of soot is temperature, at which soot is oxidized by oxygen behavior of the catalyst. The oxidizing temperature of soot is less than combustion temperature of soot at which soot burns without the oxygen behavior of the catalyst. The soot accumulating in the vicinity of the catalyst on the filter is soot accumulating near the catalyst such that the soot near the catalyst is oxidized by the oxygen behavior of the catalyst when temperature of the filter is equal to or greater then the oxidizing temperature of soot.

Alternatively, according to one aspect of the present invention, a filter is provided to an exhaust passage of an internal combustion engine. A method for estimating an amount of soot accumulating on the filter includes following processes.

Differential pressure of the filter is detected using an accumulating amount estimating means, the differential pressure of the filter being differential pressure between upstream of the filter and downstream of the filter. An oxidizing condition of soot, which accumulates on the filter, is detected using an oxidizing condition detecting means. Temperature of the filter is increased to be equal to or greater than oxidizing temperature of soot using a forcible oxidizing means for forcibly oxidizing soot accumulating in the vicinity of a catalyst supported by the filter, when the oxidizing condition detecting means detects a condition, in which soot accumulating in the vicinity of the catalyst on the filter is only partially oxidized. The amount of soot accumulating on the filter is estimated using the accumulating amount estimating means in accordance with the differential pressure of the filter after the forcible oxidizing means oxidizes soot accumulating in the vicinity of the catalyst on the filter, when the oxidizing condition detecting means detects the condition, in which soot accumulating in the vicinity of the catalyst on the filter is only partially oxidized.

Thereby, the amount of soot accumulating on the filter can be properly estimated to protect the filter from excessively increasing in temperature due to oxidizing an excessive amount of soot accumulating on the filter in a recovery operation of the filter 12. Besides, the amount of soot accumulating on the filter can be properly estimated to reduce the number of the recovery operation of the filter 12, so that fuel efficiency can be maintained.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENTS

Embodiment

Figure 1:
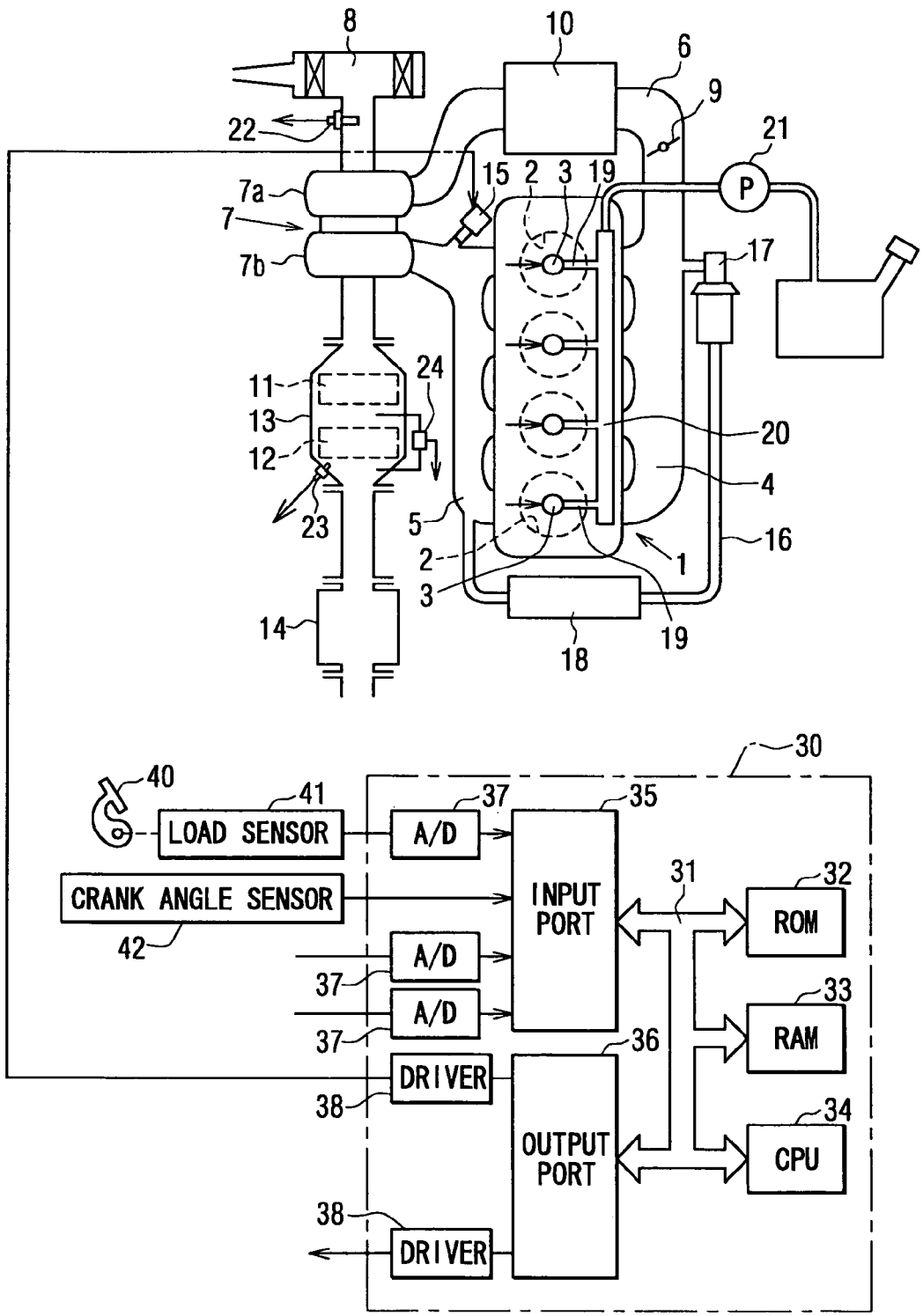
FIG. 1 is a schematic view showing an internal combustion engine including an accumulating amount estimating device, according to an embodiment of the present invention.

As shown in FIG. 1, an engine body 1 includes cylinders, to which combustion chambers 2 are respectively formed. An electrically controlled fuel injection valve 3 is provided to each cylinder for respectively injecting fuel into each combustion chamber 2. An intake manifold 4 and an exhaust manifold 5 are connected to the engine body 1. The intake manifold 4 is connected with an outlet port of a compressor 7a of an exhaust turbo charger 7 through an intake duct 6. The compressor 7a has an inlet port that is connected with an air cleaner 8. The intake duct 6 accommodates a throttle valve 9 that is rotated using a step motor. An intake air cooling device (intercooler) 10 is provided around the intake duct 6 to cool intake air flowing through the intake duct 6. Engine cooling water is introduced into the intercooler 10 to cool intake air. The exhaust manifold 5 is connected with an inlet port of an exhaust turbine 7b of the exhaust turbo charger 7. The exhaust turbine 7b has an outlet port that is connected with a casing 13, which accommodates an oxidation catalyst 11 and a particulate filter 12. The casing 13 has an outlet port that is connected with a muffler 14. The exhaust manifold 5 has an outlet port, to which a fuel adding device 15 is provided. The fuel adding device 15 adds fuel or the like into exhaust gas flowing through the exhaust manifold 5.

The exhaust manifold 5 is connected with an intake manifold 4 through an exhaust gas recirculation (EGR) passage 16 that accommodates an electrically controlled EGR valve 17. An EGR cooling device (EGR cooler) 18 is provided around the EGR passage 16 for cooling EGR gas flowing through the EGR passage 16. In this structure, engine cooling water is introduced into the EGR cooler 18, so that EGR gas is cooled using the engine cooling water. Each fuel injection valve 3 is connected with a fuel reservoir (common rail) 20 through a fuel supply passage 19. Fuel is supplied from a fuel pump 21 into the common rail 20. Fuel supplied into the common rail 20 is distributed into each fuel injection valve 3 through each fuel supply passage 19. The fuel pump 21 is electrically controlled, so that the discharge capacity of the fuel pump 21 can be varied.

An electronic control unit (ECU) 30 is constructed of a digital computer. The ECU 30 includes a read only memory (ROM) 32, a random access memory (RAM) 33, a microprocessor (central processing unit, CPU) 34, an input port 35, and an output port 36, which are connected via a bi-directional bus 31.

The intake duct 6 is provided upstream of the compressor 7a of the exhaust turbo charger 7 relative to the flow of intake air. An air flowmeter 22 is provided to the intake duct 6 to detect an amount of intake air flowing through the intake duct 6. A temperature sensor 23 is provided to the downstream of the filter 12 relative to flow of exhaust gas to detect temperature of exhaust gas flowing through the filter 12. A differential pressure sensor 24 is provided to the casing 13 to detect differential pressure (filter differential pressure) between the upstream of the filter 12 and the downstream of the filter 12. Output signals of all the air flowmeter 22, the temperature sensor 23, and the differential pressure sensor 24 are input to an input port 35 via corresponding A/D converter 37. An accelerator pedal 40 is connected with a load sensor 41 that generates a voltage signal, which is substantially in proportion to a degree of stepping the accelerator pedal 40. The voltage signal of the load sensor 41 is input to the input port 35 via a corresponding AD converter 37. The input port 35 is connected with a crank angle sensor 42 that generates pulse signals at every predetermined rotational angle of the crankshaft such as 15°. The output port 36 is connected with the fuel injection valve 3, the step motor, which rotates the throttle valve 9, the fuel adding device 15, the EGR control valve 17, and the fuel pump 21, via a corresponding driving circuit 38.

Figure 2A:
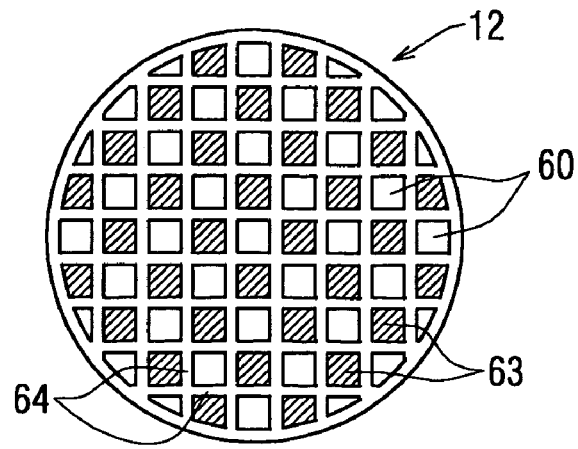
FIG. 2A is a front view showing a particulate filter of the accumulating amount estimating device.
Figure 3A:
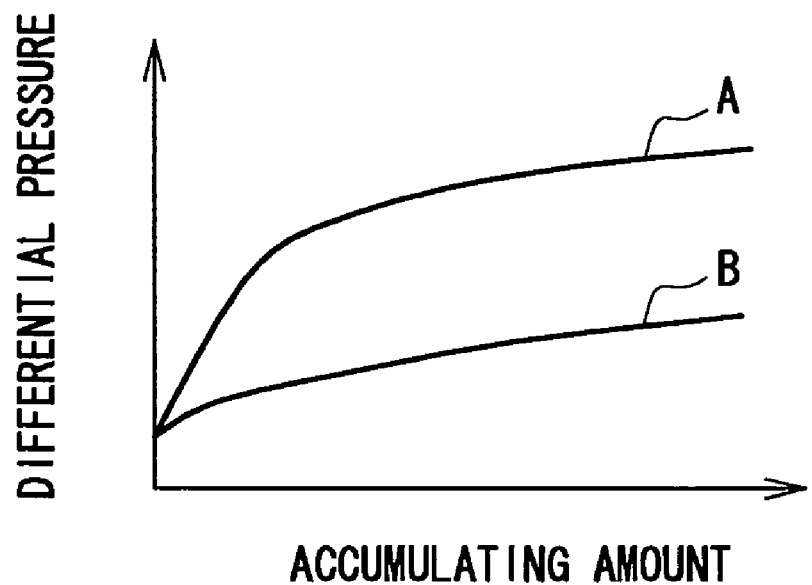
FIGS. 3A, 3B are graphs showing relationships between an accumulating amount of soot and differential pressure of the particulate filter, according to the embodiment.

As shown in FIGS. 2A, 3A, the filter 12 has a honeycomb structure that includes multiple exhaust gas passages 60, 61 that respectively extend in parallel with each other. Specifically, the exhaust gas passages 60 are respectively plugged by plugs 62 on the downstream ends thereof, and the exhaust gas passages 61 are respectively plugged by plugs 63 on the upstream ends thereof. The exhaust gas passages 60, 61 are arranged alternatively via thin-walled partition walls 64. Specifically, each exhaust gas passage 60 is surrounded by four exhaust gas passages 61, and each exhaust gas passage 61 is surrounded by four exhaust gas passages 60.

Figure 2B:
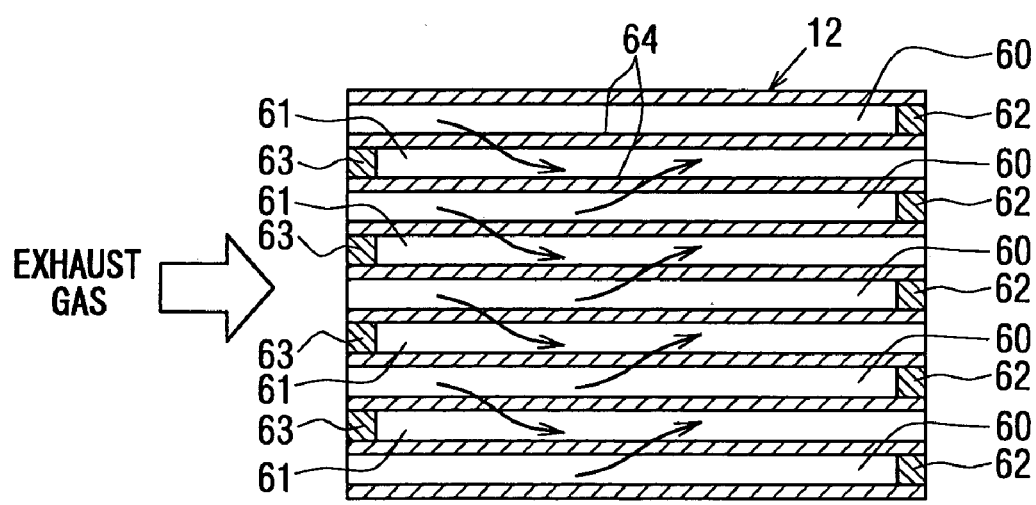
FIG. 2B is a cross sectional side view showing the particulate filter, according to the embodiment.

The filter 12 is formed of a porous material such as cordierite. As shown by arrows in FIG. 2B, exhaust gas, which flows through the exhaust gas passage 60, enters into the exhaust gas passage 61, which is adjacent to the exhaust gas passage 60, through pores (small holes) formed in the partition wall 64 partitioning therebetween. Particulate matters included in exhaust gas flowing through the filter 12 adheres onto the surfaces of the partition walls 64, while flowing along the partition walls 64 of the filter 12, so that the particulate matters are collected by the filter 12. Alternatively, particulate matters included in exhaust gas adheres to the surfaces of the pores formed in the partition walls 64, while passing through the pores in the partition walls 64, so that the particulate matters are collected by the filter 12.

Thus, when the amount of particulate matters collected using the filter 12 increases, particulate matters gradually accumulate on the surfaces of the partition walls 64 and the pores of the partition walls 64. In this situation, clogging starts in the filter 12. That is, as particulate matters accumulate on the filter 12, the filter 12 is gradually clogged. Accordingly, the filter differential pressure in exhaust gas flow increases. When differential pressure, i.e., pressure loss in exhaust gas increases due to clogging the filter 12, pressure of exhaust gas increases on the upstream of the filter 12. As a result, an engine performance may be degraded, and fuel efficiency may be degraded.

Accordingly, in general, an amount of particulate matter such as soot accumulating on the filter 12 needs to be estimated.

When the estimated amount of soot becomes greater than a predetermined amount (limit accumulating amount), temperature of the filter 12 increases to combustion temperature of soot such as 600° C., so that soot accumulating on the filter 12 is burned and removed in a filter recovery operation. Thereby, the filter 12 is capable of being restricted from causing clogging due to accumulation of particulate matters such as soot.

The limit accumulating amount represents a maximum amount of soot accumulating on the filter 12. The maximum amount of soot is defined such that even when the amount of soot accumulating on the filter 12 becomes the maximum amount and temperature of the filter 12 increases to the combustion temperature of soot, soot accumulating on the filter 12 does not burn at one time and temperature of the filter 12 does not excessively increases.

The filter recovery operation is performed when the amount of soot accumulating on the filter 12 is around the limit accumulating amount. Thereby, the filter 12 can be protected from causing erosion due to excessive increase in temperature of the filter 12. Besides, the number of operations of the filter recovery operation of the filter 12 is reduced. Fuel and energy are consumed in the filter recovery operation of the filter 12. Therefore, fuel efficiency can be maintained by reducing the number of the filter recovery operation.

A temperature increasing operation is carried out in the filter recovery operation of the filter 12. Specifically, temperature of the filter 12 is increased, and maintained at a predetermined temperature, which is equal to or greater than the combustion temperature of soot in the temperature increasing operation. More specifically, the temperature sensor 23 detects temperature of exhaust gas flowing downstream of the filter 12 to estimate temperature of the filter 12. Temperature of the filter 12 is feedback-controlled such that the estimated temperature of the filter 12 is maintained to be equal to or greater than the combustion temperature of soot.

The temperature increasing operation can be carried out in two following manners, for example. The first manner of the temperature increasing operation is an exhaust gas temperature increasing operation (exhaust heating operation), in which temperature of exhaust gas flowing into the filter 12 is increased. Specifically, a timing of injection of fuel into the combustion chamber 2 of the engine is delayed. Alternatively, a small amount of fuel is injected into and burned in the combustion chamber 2 of the engine, after injecting fuel, which is for operating the engine. Alternatively, an electric heater or a glow plug is provided to the upstream of the filter 12, and is operated, so that temperature of exhaust gas is increased. As a result, temperature of the filter 12 is increased by carrying out of the above three manners of the exhaust heating operation. Furthermore, when an ignition plug is provided in the combustion chamber 2 to ignite fuel, temperature of exhaust gas can be increased by delaying an ignition timing of fuel.

The second manner of the temperature increasing operation is an exothermic temperature increasing operation (exothermic operation), in which temperature of filter 12 is increased by causing a chemical reaction on the filter 12. Specifically, a small amount of fuel is injected into the combustion chamber 2 of the engine after injecting fuel for operating the engine, and the small amount of fuel is exhausted from the combustion chamber 2 without being burned. Alternatively, the fuel adding device 15 is provided to the upstream of the filter 12 in the flow of exhaust gas, and the fuel adding device 15 adds fuel into exhaust gas, so that fuel is supplied to exhaust gas and is burned on the filter 12. As a result, temperature of the filter 12 is increased by carrying out of the above two manners of the exothermic operation.

In a stratified charge engine such as a spark-ignition type direct fuel injection engine, a stratified combustion condition can be changed to a homogeneous combustion condition (uniform combustion condition) in the combustion chamber 2, so that a temperature increasing operation can be carried out in addition to the above manners of the temperature increasing operation. Specifically, when the stratified combustion condition is changed to the homogeneous combustion condition, EGR gas is stopped flowing into the combustion chamber 2, and opening degree of the throttle valve 9 is set to be small.

In addition, the amount (soot accumulating amount) of soot accumulating on the filter 12 needs to be properly estimated to protect the filter from excessively increasing in temperature due to excessive amount of soot accumulating on the filter 12 in the recovery operation of the filter 12. Besides, the soot accumulating amount needs to be properly estimated to reduce the number of the recovery operation of the filter 12 for maintaining fuel efficiency. When soot substantially uniformly accumulates on the filter 12, the soot accumulating amount and the filter differential pressure have a specific relationship. The soot accumulating amount is estimated in accordance with the filter differential pressure that represents pressure loss caused by the filter 12 in exhaust gas.

As shown in FIG. 3A, a curved line A represents a relationship between the soot accumulating amount and the filter differential pressure in exhaust gas when soot accumulating on the filter 12 is not burned and not oxidized. As shown by the curved line A, as the soot accumulating amount increases, the differential pressure in exhaust gas caused by the filter 12 increases. Specifically, when the soot accumulating amount is small, degree of increase in the differential pressure with respect to increase in the soot accumulating amount is large. That is, the filter differential pressure relatively steeply increases as the soot accumulating amount increases, when the soot accumulating amount is small. In this situation, when relatively small amount of soot accumulates on the filter 12, soot is apt to accumulate on the surfaces of pores formed in the partition walls 64 compared with the surfaces of the partition walls 64. The filter differential pressure is apt to quickly increase when soot accumulates on the surfaces of pores in the partition walls 64 compared with a condition, in which soot accumulates on the surfaces of the partition walls 64.

In this embodiment, when the soot accumulating amount is estimated, the relationship between the soot accumulating amount and the filter differential pressure, i.e., the relationship shown by the curved line A in FIG. 3A is obtained by an experiment or a calculation, in advance. This relationship is stored in the ROM 32 of the ECU 30 as a data map (unoxidized map). The soot accumulating amount is estimated using the unoxidized map in accordance with the filter differential pressure detected using the differential pressure sensor 24 when the engine is operated.

The catalyst such as platinum (Pt) is supported by a catalyst support formed of alumina or the like. Specifically, the catalyst is supported on the surfaces of pores in the partition walls 64, and is supported on the surfaces of the partition walls 64 in the filter 12. The catalyst shows an oxygen behavior. Therefore, soot accumulating in the vicinity of the catalyst supported in the filter 12 is oxidized and removed when temperature of the filter 12 is around an oxidization temperature of soot such as 450° C. to 500° C. The oxidization temperature of soot is lower than the combustion temperature of soot.

Therefore, when temperature of the filter 12 increases to be equal to or greater than the oxidization temperature of soot, soot accumulating in the vicinity of the catalyst in the filter 12 is oxidized. In this situation, the relationship between the soot accumulating amount and the filter differential pressure differs from the relationship, in which soot is not burned and not oxidized, shown by the curved line A in FIG. 3A. The relationship between the soot accumulating amount and the filter differential pressure, when soot accumulating in the vicinity of the catalyst in the filter 12 is oxidized, is shown by the curved line B in FIG. 3A.

Specifically, as shown by the curved line B, when the soot accumulating amount is small, degree of increase in the differential pressure with respect to increase in the soot accumulating amount is smaller than that in the relationship shown by the curved line A. That is, when the soot accumulating amount is small, the filter differential pressure relatively gradually increases as the soot accumulating amount increases, in the relationship shown by the curved line B.

Here, soot accumulating on the surfaces of the pores is apt to be oxidized by the catalyst, compared with soot accumulating on the surfaces of the partition walls 64 in the filter 12. The reason is as follows. Each pore in the partition wall 64 has the surface, which substantially surround a hollow portion of the pore. By contrast, each partition wall 64 has the surface, which is substantially plain. In the structure of the filter 12, particles of the catalyst may be spaced uniformly on the surfaces of the pores, and may be spaced uniformly on the surfaces of the partition walls 64. In this structure, an amount of catalyst becomes large in a specific circular range with respect to a piece of soot accumulating around the hollow portion of the pore. Thereby, soot around the pore can easily make contact with catalyst. Thus, soot accumulating on the surfaces of the pores is apt to be oxidized in the partition walls 64.

Because of the above reasons, when temperature of the filter 12 is equal to or greater than the oxidization temperature of soot, the unoxidized map cannot be used for estimating the soot accumulating amount. However, even in this case, the soot accumulating amount and the filter differential pressure have a specific relationship, when soot uniformly accumulates on the filter 12.

Therefore, when the soot accumulating amount is estimated, the relationship between the soot accumulating amount and the filter differential pressure, i.e., the relationship shown by the curved line B in FIG. 3A is obtained by an experiment or a calculation, in advance. This relationship is stored in the ROM 32 of the ECU 30 as a data map (oxidized map). The soot accumulating amount is estimated using the oxidized map in accordance with the filter differential pressure detected using the differential pressure sensor 24.

In this embodiment, in general, when temperature of the filter 12 is less than the oxidization temperature of soot, the soot accumulating amount is estimated using the unoxidized map in accordance with the filter differential pressure, and when temperature of the filter 12 is equal to or greater than the oxidization temperature of soot, the soot accumulating amount is estimated using the oxidized map in accordance with the filter differential pressure.

When the filter 12 is maintained at relatively high temperature such as 300° C. to 400° C., soot accumulating on the filter 12 partially oxidized by the oxygen behavior of the catalyst supported on the filter 12, even when temperature of the filter 12 does not increases to the oxidization temperature of soot. In this situation, temperature of the filter 12 and flow rate of exhaust gas in the filter 12 are locally high. That is, soot accumulating on the filter 12 is not uniformly distributed throughout the filter 12, and the soot accumulating amount varies from one region to another region in the filter 12.

In this case, an amount (soot oxidized amount) of soot, which is oxidized, and a region, in which soot is oxidized in the filter 12, are not constant. Accordingly, the relationship between the soot accumulating amount and the filter differential pressure is not constant. Particularly, when soot on the filter 12 is partially oxidized, soot accumulating on the pores is apt to be quickly oxidized compared with soot accumulating on the plain surfaces of the partition walls 64. Therefore, oxidization begins from soot accumulating on the pores. In this situation, the filter differential pressure largely decreases, even when only a small amount of soot is oxidized. In this situation, soot accumulating on the filter 12 is only partially oxidized, and the unoxidized map cannot be used for estimating the soot accumulating amount as an approximate map. Furthermore, a data map, which corresponds to this situation, in which soot on the filter 12 is only partially oxidized, cannot be produced. Accordingly, when soot is only partially oxidized on the filter 12, it is difficult to properly estimate the soot accumulating amount.

In this embodiment, when soot on the filter 12 is partially oxidized, temperature increasing operation is carried out to forcibly increase temperature of the filter 12 to be equal to or greater than the oxidization temperature of soot. Thereby, soot accumulating in the vicinity of the catalyst in the filter 12 is substantially entirely oxidized in a uniformizing operation. Thus, soot substantially uniformly accumulates throughout the filter 12 through the uniformizing operation. Subsequently, the soot accumulating amount is calculated using the oxidized map in accordance with the filter differential pressure.

Figure 4:
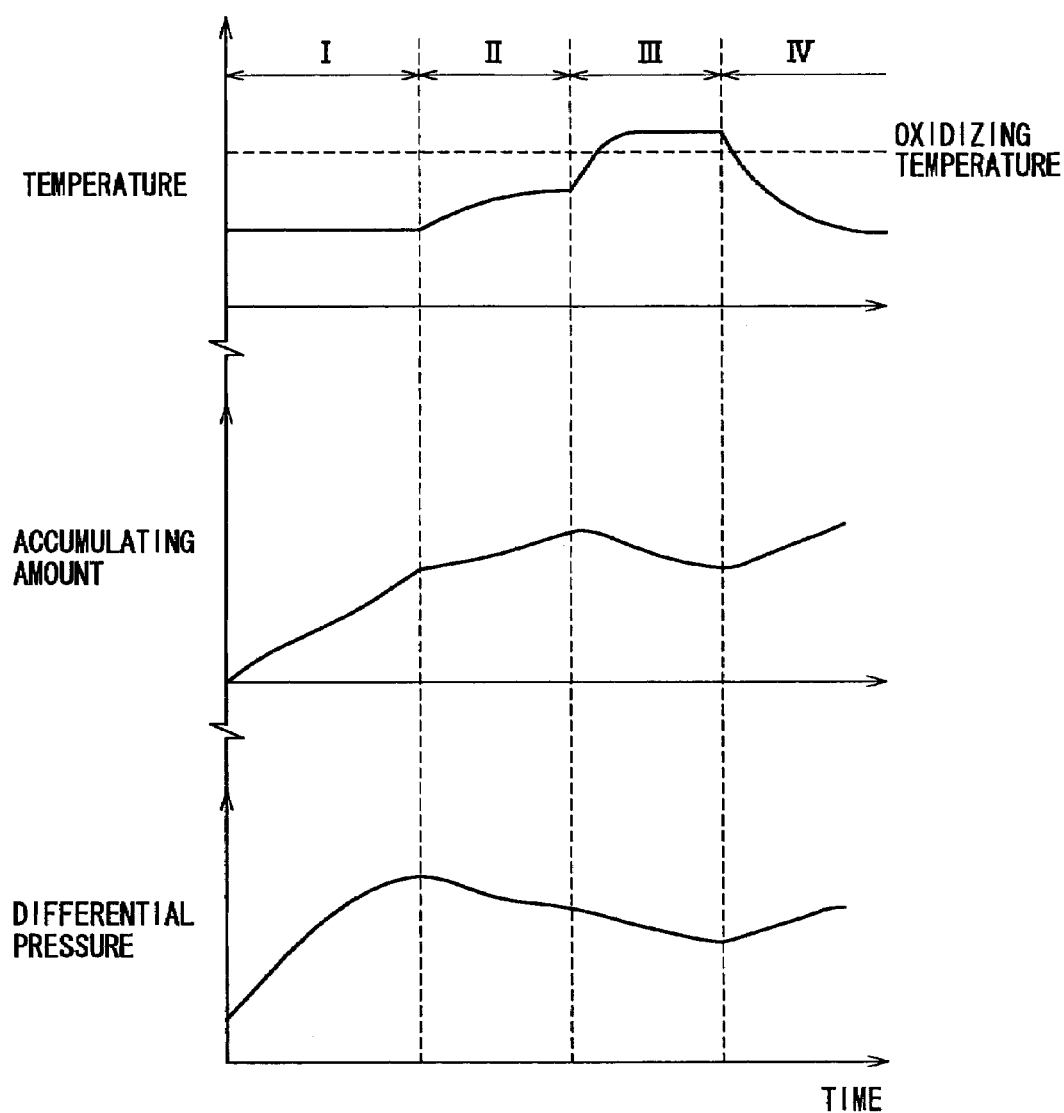
FIG. 4 is a time chart showing a relationship among temperature of the particulate filter, the accumulating amount of soot, and the differential pressure of the particulate filter according to the embodiment.

In a timing chart shown in FIG. 4, temperature of the filter 12 is low in a region I. Even when soot accumulates on the filter 12, soot is not oxidized and is not burned, therefore the soot accumulating amount increases as time elapses in the region I. As the soot accumulating amount increases, the filter differential pressure increases along the curved line A in FIG. 3A. In this region I, the soot accumulating amount can be estimated using the unoxidized map in accordance with the filter differential pressure detected using the differential pressure sensor 24.

In a region II, the engine operation condition changes, and temperature of the filter 12 increases to a relatively high-temperature less than the oxidization temperature of soot. In this situation, soot accumulating on the filter 12 is partially oxidized. In the region II of this example shown in FIG. 4, the soot oxidized amount per unit of time is greater than an amount of soot collected by the filter 12 per unit of time, therefore the soot accumulating amount increases in the region II. By contrast, soot on the pores in the partition walls 64 is oxidized in the filter 12, therefore the filter differential pressure decreases, as described above.

When partial oxidation of soot accumulating on the filter 12 is detected, the temperature increasing operation is performed in a region III, and the uniformizing operation, in which the filter is increases in temperature to the oxidization temperature of soot, is carried out. Thereby, soot accumulating on the filter 12 is substantially entirely oxidized and is substantially entirely removed in the vicinity of the catalyst supported by the filter 12, so that the filter differential pressure decreases.

When soot, which accumulates in the vicinity of the catalyst supported by the filter 12, is substantially entirely oxidized and removed, the uniformizing operation is terminated. In this situation, temperature of the filter 12 decreases, and both the soot accumulating amount and the filter differential pressure restart increasing in a region IV. Thereby, soot substantially uniformly accumulates throughout the filter 12, so that the relationship between the soot accumulating amount and the filter differential pressure substantially corresponds to the relationship shown by the curved line B in FIG. 3A. Thus, in this region IV, the soot accumulating amount can be estimated using the oxidized map in accordance with the filter differential pressure detected using the differential pressure sensor 24.

Figure 3B:
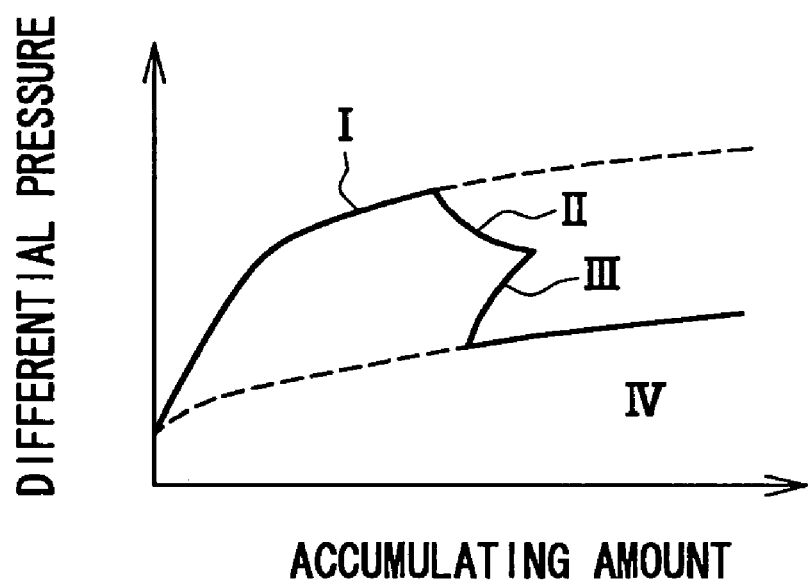

FIG. 3B depicts a relationship between the soot accumulating amount and the filter differential pressure while temperature of the filter 12 changes as shown in FIG. 4.

In the region I, when temperature of the filter 12 is low, the filter differential pressure increases along the curbed line A in FIG. 3A as the soot accumulating amount increases. In the region II, temperature of the filter 12 increases to the relatively high-temperature less than the oxidization temperature of soot, so that the filter differential pressure decreases while the soot accumulating amount increases. Subsequently, in the region III, temperature of the filter 12 increases to the oxidization temperature of soot by the uniformizing operation, so that both the soot accumulating amount and the filter differential pressure decreases. Thereby, the relationship between the soot accumulating amount and the filter differential pressure substantially corresponds to the curbed line B in FIG. 3A through the uniformizing operation in the region III. Subsequently, when the uniformizing operation terminates, the filter differential pressure increases along the curbed line B in FIG. 3A as the soot accumulating amount increases in the region IV.

When soot accumulating on the filter 12 is partially oxidized, the soot accumulating amount cannot be estimated using the unoxidized map. In this case, temperature of the filter 12 is increased to the oxidization temperature of soot by the uniformizing operation, so that soot accumulating around the catalyst in the filter 12 is substantially entirely oxidized, in this embodiment. Thereby, soot substantially uniformly accumulates throughout the filter 12, so that the soot accumulating amount can be estimated using the oxidized map. Thus, the soot accumulating amount can be properly estimated using one of the unoxidized map and the oxidized map in most of all period in the engine operation.

Figure 5:
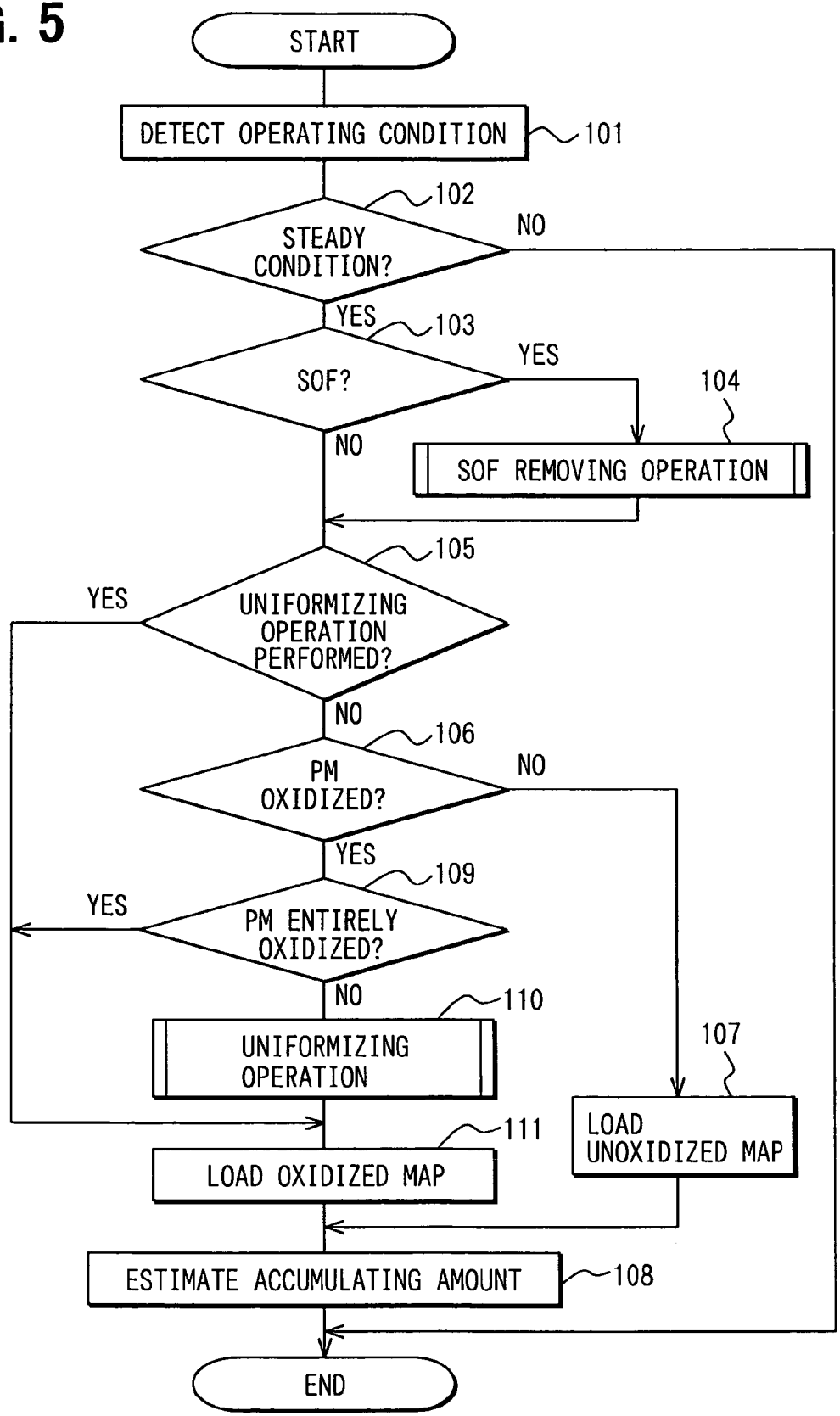
FIG. 5 is a flowchart showing an operation of an accumulating amount estimating operation, according to the embodiment.

FIG. 5 depicts an operating routine of an accumulating amount estimating operation for estimating the soot accumulating amount. In step 101, various parameters of the engine operating condition are detected. This various parameters include operating information such as load of the engine, rotation speed of the engine, a flow amount of intake air, and temperature of the filter 12. Subsequently, in step 102, it is evaluated whether the engine is in a steady operating condition or not, in accordance with the various parameters detected in step 101. When it is evaluated that the engine is not in the steady operating condition, the routine is terminated, and the soot accumulating amount on the filter 12 is not estimated. Specifically, the filter differential pressure varies due to various parameters such as a flow amount of exhaust gas, as well as due to the soot accumulating amount. When the engine is not in the steady operating condition, these various parameters largely varies, consequently the filter differential pressure, which is detected using the differential pressure sensor 24, largely varies. As a result, the soot accumulating amount cannot be properly estimated. Therefore, when the engine is not in the steady operating condition, estimation of the soot accumulating amount is not carried out.

On the contrary, when the engine is determined to be in the steady operating condition, the routine proceed to step 103, in which it is evaluated whether soluble organic fraction (SOF) adheres on the filter 12. When it is determined that SOF adheres on the filter 12, the routine proceed to step 104, in which an SOF removing operation is carried out to remove SOF adhering on the filter 12.

Here, SOF is one of various kinds of substances composing particulate matters. SOF is oxidized at specific oxidization temperature (oxidization temperature of SOF) that is less than the oxidization temperature of soot, which is a main substance of particulate matters. Specifically, SOF is oxidized at the oxidization temperature, which is relatively low temperature such as 250° C. to 300° C. SOF also slightly increases the filter differential pressure when SOF adheres on the filter 12. Accordingly, when SOF adheres on the filter 12, it becomes difficult to estimate the soot accumulating amount in accordance with the filter differential pressure. Therefore, in this embodiment, when SOF adheres on the filter 12, SOF is removed from the filter 12 before detecting the filter differential pressure to estimate the soot accumulating amount.

Adhesion of SOF on the filter 12 is evaluated in accordance with a history of the operating condition of the engine. For example, when temperature of the filter is maintained around 250° C. to 300° C., it is determined that SOF does not adhere on the filter 12. The SOF removing operation is performed such that temperature of the filter 12 is increased to the oxidization temperature of SOF by the temperature increasing operation, for example.

When it is determined that SOF does not adhere on the filter 12 in step 103, or when the SOF removing operation is performed in step 104, the routine proceeds to step 105, in which it is evaluated whether the uniformizing operation is performed after the recovery operation of the filter 12. When it is determined that the uniformizing operation is not performed, the routine proceed to step 106.

In step 106, it is evaluated whether soot accumulating on the filter 12 is partially oxidized, in accordance with a history of temperature of the filter 12. For example, when temperature of the filter 12 is maintained around 300° C. to 400° C. for a predetermined period, it is determined that soot accumulating on the filter 12 is partially oxidized. In step 106, when it is determined that soot accumulating on the filter 12 is not oxidized almost at all, the routine proceeds to step 107, in which the unoxidized map is loaded. Subsequently, in step 108, the soot accumulating amount is estimated using the unoxidized map in accordance with the filter differential pressure detected using the differential pressure sensor 24.

On the contrary, when it is determined that soot accumulating on the filter 12 is partially oxidized in step 106, the routine proceeds to step 109, in which it is evaluated whether soot in the vicinity of the catalyst supported by the filter 12 is substantially entirely oxidized, in accordance with the history of temperature of the filter 12. For example, when temperature of the filter 12 is maintained to be equal to or greater than the oxidization temperature of soot for a predetermined period, it is determined that soot accumulating on the filter 12 is substantially entirely oxidized.

When it is determined that soot accumulating on the filter 12 is partially oxidized in step 109, the routine proceeds to step 110, in which the uniformizing operation is performed. Specifically, temperature of the filter 12 is maintained at temperature equal to or greater than the oxidization temperature of soot for a predetermined period. Subsequently, the routine proceed to step 111. By contrast, when it is determined that soot in the vicinity of the catalyst supported by the filter 12 is substantially entirely oxidized in step 109, the uniformizing operation need not be performed. Therefore, the routine proceeds from step 109 to step 111 after skipping step 110. In step 111, the oxidized map is loaded. Subsequently, in step 108, the soot accumulating amount is estimated using the oxidized map, which is loaded in step 111, in accordance with the filter differential pressure, which is detected in step 108 using the differential pressure sensor 24.

The filter pressure difference, which arises in exhaust gas, does not necessarily change corresponding to only the soot accumulating amount. In reality, the filter pressure difference changes due to variation in the flow amount of exhaust gas and the like, as well as variation in the soot accumulating amount. Therefore, a data map representing a relationship among parameters such as the soot accumulating amount and the flow amount of exhaust gas, and the filter pressure difference, is used in an actual accumulating amount estimating device. Alternatively, multiple data maps representing relationships among parameters such as the soot accumulating amount, the flow amount of exhaust gas, and the filter pressure difference may be used.

The structures and methods of the above embodiments can be combined as appropriate.

It should be appreciated that while the processes of the embodiments of the present invention have been described herein as including a specific sequence of steps, further alternative embodiments including various other sequences of these steps and/or additional steps not disclosed herein are intended to be within the steps of the present invention.

Various modifications and alternations may be diversely made to the above embodiments without departing from the spirit of the present invention.

What is claimed is:

1. An accumulating amount estimating device comprising:
    a filter that is arranged in an exhaust passage of an internal combustion engine, the filter supporting a catalyst;
    an accumulating amount estimating means that detects differential pressure of the filter, the accumulating amount estimating means estimating an amount of soot accumulating on the filter in accordance with the differential pressure of the filter, the differential pressure of the filter being differential pressure between upstream of the filter and downstream of the filter;
    an oxidizing condition detecting means that detects an oxidizing condition of soot accumulating on the filter; and
    a forcible oxidizing means that increases temperature of the filter to be equal to or greater than oxidizing temperature of soot for forcibly oxidizing soot accumulating in the vicinity of the catalyst supported by the filter,
    wherein when the oxidizing condition detecting means detects a condition, in which soot accumulating in the vicinity of the catalyst on the filter is only partially oxidized, the accumulating amount estimating means estimates the amount of soot accumulating on the filter after the forcible oxidizing means oxidize soot accumulating in the vicinity of the catalyst on the filter;
    an unoxidized map that represents a relationship between the differential pressure of the filter and the amount of soot accumulating on the filter when soot accumulating on the filter is at least substantially entirely unoxidized; and
    an oxidized map that represents the relationship between the differential pressure of the filter and the amount of soot accumulating on the filter when soot accumulating in the vicinity of the catalyst on the filter is at least substantially entirely oxidized,
    wherein when the oxidizing condition detecting means detects a condition, in which soot accumulating on the filter is at least substantially entirely unoxidized, the accumulating amount estimating means estimates the amount of soot accumulating on the filter using the unoxidized map in accordance with the detected differential pressure of the filter, when the oxidizing condition detecting means detects a condition, in which soot accumulating in the vicinity of the catalyst on the filter is at least substantially entirely oxidized, the accumulating amount estimating means estimates the amount of soot accumulating on the filter using the oxidized map in accordance with the detected differential pressure of the filter, and when the oxidizing condition detecting means detects a condition, in which soot accumulating in the vicinity of the catalyst on the filter is only partially oxidized, the accumulating amount estimating means estimates the amount of soot accumulating on the filter using the oxidized map in accordance with the detected differential pressure of the filter after the forcible oxidizing means oxidizes soot accumulating in the vicinity of the catalyst on the filter.

2. The accumulating amount estimating device according to claim 1, wherein the oxidizing condition detecting means detects the oxidizing condition of soot accumulating on the filter in accordance with a history of temperature of the filter.

3. The accumulating amount estimating device according to claim 1, further comprising:
   an SOF detecting means that detects soluble organic fraction adhering on the filter; and
   a removing means that removes soluble organic fraction adhering on the filter when the SOF detecting means detects a condition, in which soluble organic fraction adheres on the filter, before the accumulating amount estimating means estimates the amount of soot accumulating on the filter.

4. A method for estimating an amount of soot accumulating on a filter, which is provided to an exhaust passage of an internal combustion engine, the method comprising:
   detecting differential pressure of the filter using an accumulating amount estimating means, wherein the differential pressure of the filter is differential pressure between upstream of the filter and downstream of the filter;
   detecting an oxidizing condition of soot, which accumulates on the filter, using an oxidizing condition detecting means; and
   increasing temperature of the filter to be equal to or greater than oxidizing temperature of soot using a forcible oxidizing means for forcibly oxidizing soot accumulating in the vicinity of a catalyst supported by the filter, when the oxidizing condition detecting means detects a condition, in which soot accumulating in the vicinity of the catalyst on the filter is only partially oxidized; and
   estimating the amount of soot accumulating on the filter using the accumulating amount estimating means in accordance with the differential pressure of the filter after the forcible oxidizing means oxidizes soot accumulating in the vicinity of the catalyst on the filter, when the oxidizing condition detecting means detects the condition, in which soot accumulating in the vicinity of the catalyst on the filter is only partially oxidized,
   wherein when the oxidizing condition detecting means detects a condition, in which soot accumulating on the filter is at least substantially entirely unoxidized, the accumulating amount estimating means estimates the amount of soot accumulating on the filter using an unoxidized map in accordance with the detected differential pressure of the filter,
   when the oxidizing condition detecting means detects a condition, in which soot accumulating in the vicinity of the catalyst on the filter is at least substantially entirely oxidized, the accumulating amount estimating means estimates the amount of soot accumulating on the filter using an oxidized map in accordance with the detected differential pressure of the filter, and
   when the oxidizing condition detecting means detects a condition, in which soot accumulating in the vicinity of the catalyst on the filter is only partially oxidized, the accumulating amount estimating means estimates the amount of soot accumulating on the filter using the oxidized map in accordance with the detected differential pressure of the filter after the forcible oxidizing means oxidizes soot accumulating in the vicinity of the catalyst on the filter,
   wherein the unoxidized map represents a relationship between the differential pressure of the filter and the amount of soot accumulating on the filter when soot accumulating on the filter is at least substantially entirely unoxidized, and
   the oxidized map represents the relationship between the differential pressure of the filter and the amount of soot accumulating on the filter when soot accumulating in the vicinity of the catalyst on the filter is at least substantially entirely oxidized.

5. The method according to claim 4, further comprising:
   estimating the amount of soot accumulating on the filter using the accumulating amount estimating means in accordance with the differential pressure of the filter without oxidizing soot accumulating in the vicinity of the catalyst on the filter using the forcible oxidizing means, when the oxidizing condition detecting means detects one of following two conditions, in which:
   soot accumulating on the filter is at least substantially entirely unoxidized; and
   soot accumulating in the vicinity of the catalyst on the filter is at least substantially entirely oxidized.

6. The method according to claim 4, wherein the oxidizing condition detecting means detects the oxidizing condition of soot accumulating on the filter in accordance with a history of temperature of the filter.

7. The method according to claim 4, further comprising:
   detecting soluble organic fraction adhering on the filter using an SOF detecting means; and
   removing soluble organic fraction adhering on the filter using a removing means when the SOF detecting means detects a condition, in which soluble organic fraction adheres on the filter, before estimating the amount of soot accumulating on the filter.

8. Apparatus comprising:
   a filter supporting a catalyst in an exhaust passage of an internal combustion engine;
   means for detecting a differential pressure between upstream and downstream sides of the filter and estimating an amount of soot accumulated on the filter based on the detected differential pressure;
   means for detecting an oxidizing condition of soot accumulated on the filter; and
   means for increasing a temperature of the filter to be equal to or greater than an oxidizing temperature of soot thereby forcibly oxidizing soot accumulated in the vicinity of catalyst supported by the filter,
   wherein when it is detected that soot accumulated in the vicinity of the catalyst is only partially oxidized, the amount of soot accumulated on the filter is estimated after soot accumulated in the vicinity of the catalyst has been forcible oxidized;

an unoxidized map representing a relationship between the differential pressure of the filter and the amount of substantially entirely unoxidized soot accumulated on the filter;

an oxidized map representing a relationship between the differential pressure of the filter and the amount of substantially entirely oxidized soot accumulated on the filter in the vicinity of the catalyst;

wherein, when it is detected that soot accumulated on the filter is substantially entirely unoxidized, the amount of soot accumulated on the filter is estimated using the unoxidized map based on the detected differential pressure of the filter;

wherein, when it is detected that soot accumulated in the vicinity of the catalyst on the filter is substantially entirely oxidized, the amount of soot accumulated on the filter is estimated using the oxidized map based on the detected differential pressure of the filter, and wherein, when it is detected that soot accumulated in the vicinity of the catalyst on the filter is only partially oxidized, the amount of soot accumulated on the filter is estimated using the oxidized map based on detected differential pressure of the filter the accumulated soot has been forcibly oxidized.

9. Apparatus as in claim 8 wherein the oxidizing condition of soot accumulated on the filter is detected in accordance with a history of the filter temperature.

10. Apparatus as in claim 8 further comprising:
means for detecting a soluble organic fraction of soot adhering to the filter; and
means for removing the soluble organic fraction adhering on the filter before estimating the amount of soot accumulated on the filter.

11. A method for estimating an amount of soot accumulated on a filter situated in an exhaust passage of an internal combustion engine, the method comprising:
detecting differential upstream/downstream filter;
detecting an oxidizing condition of soot, accumulated on the filter;
increasing filter temperature to be equal to or greater than an oxidizing temperature of soot and forcibly oxidizing accumulated soot in the vicinity of a filter-supported catalyst when soot accumulated in the vicinity of the catalyst is only partially oxidized;

estimating the amount of accumulated soot based on the differential filter pressure after forcibly oxidizing accumulated soot in the vicinity of the catalyst when accumulated soot is only partially oxidized;

wherein when accumulated soot is substantially entirely unoxidized, the amount of accumulated soot is estimated using an unoxidized map and the detected differential filter pressure;

wherein when the accumulated soot is substantially entirely oxidized, estimating the amount of accumulated soot using an oxidized map and the detected differential filter pressure; and wherein when the accumulated soot is only partially oxidized, the amount of accumulated soot is estimated using the oxidized map and the detected differential filter pressure after forcibly oxidizing accumulated soot in the vicinity of the catalyst;

wherein the unoxidized map represents a relationship between the differential filter pressure and the amount of accumulated soot when that soot is substantially entirely unoxidized, and wherein the oxidized map represents a relationship between the differential filter pressure and the amount of accumulated soot when that soot is substantially entirely oxidized.

12. The method of claim 11 further comprising:
estimating the amount of accumulated soot using the differential filter pressure without having forcibly oxidized accumulated soot when one of following two conditions exists:
soot accumulated on the filter is substantially entirely unoxidized; and
soot accumulated in the vicinity of the catalyst on the filter is substantially entirely oxidized.

13. A method as in claim 11 wherein the oxidizing condition of accumulated soot on the filter is detected in accordance with a history of filter temperature.

14. A method as in claim 11 further comprising:
detecting a soluble organic fraction of soot adhering on the filter; and
removing the detected soluble organic fraction of soot adhering on the filter before estimating the amount of accumulated soot on the filter.

* * * * *